(12) United States Patent
Jonker

(10) Patent No.: US 11,626,767 B2
(45) Date of Patent: Apr. 11, 2023

(54) STATOR WITH TERMINAL CONNECTOR

(71) Applicant: E-TRACTION EUROPE B.V., Apeldoorn (NL)

(72) Inventor: Adrianus Petrus Maria Jonker, Apeldoorn (NL)

(73) Assignee: E-TRACTION EUROPE B.V., Apeldoorn (NL)

(*) Notice: Subject to any disclaimer, the term of this patent is extended or adjusted under 35 U.S.C. 154(b) by 33 days.

(21) Appl. No.: 16/632,608

(22) PCT Filed: Jul. 20, 2018

(86) PCT No.: PCT/NL2018/050506
§ 371 (c)(1),
(2) Date: Jan. 21, 2020

(87) PCT Pub. No.: WO2019/017790
PCT Pub. Date: Jan. 24, 2019

(65) Prior Publication Data
US 2020/0204030 A1 Jun. 25, 2020

(30) Foreign Application Priority Data
Jul. 20, 2017 (NL) ..................... 2019307

(51) Int. Cl.
*H02K 3/52* (2006.01)
*B60K 7/00* (2006.01)
(Continued)

(52) U.S. Cl.
CPC ........... *H02K 3/522* (2013.01); *B60K 7/0007* (2013.01); *H02K 1/146* (2013.01); *H02K 1/2786* (2013.01);
(Continued)

(58) Field of Classification Search
CPC ...... H02K 3/522; H02K 1/146; H02K 1/2786; H02K 7/006; H02K 2203/09; H02K 7/14;
(Continued)

(56) References Cited

U.S. PATENT DOCUMENTS

| 5,412,269 A | 5/1995 | Couture |
| 7,347,427 B2 | 3/2008 | Heinen |

(Continued)

FOREIGN PATENT DOCUMENTS

| CN | 1518191 A | 8/2004 |
| DE | 10 2007 061 107 A1 | 6/2008 |

(Continued)

OTHER PUBLICATIONS

International Search Report and Written Opinion, dated Nov. 20, 2018, from corresponding/related International Application No. PCT/NL2018/050506.

*Primary Examiner* — John K Kim
(74) *Attorney, Agent, or Firm* — Nixon & Vanderhye

(57) ABSTRACT

An in-wheel motor is disclosed including a stator and a rotor arranged around the stator, the stator including a cylindrical surface and coils with windings around axially oriented core members and including coil terminals, the motor further including a connector including at least two mutually isolated conductors arranged at the first end of the cylindrical surface near curved ends, the conductors each including a circumferential conducting body and a plurality of contact members extending from conducting the body and arranged for connecting to one of the terminals, wherein the circumferential conducting bodies are axially spaced apart from each other.

14 Claims, 5 Drawing Sheets

(51) Int. Cl.
*H02K 1/14* (2006.01)
*H02K 1/27* (2022.01)
*H02K 7/00* (2006.01)
*H02K 1/2786* (2022.01)

(52) U.S. Cl.
CPC ...... *H02K 7/006* (2013.01); *B60K 2007/0092* (2013.01); *H02K 2203/09* (2013.01)

(58) Field of Classification Search
CPC .................. H02K 11/33; B60K 7/0007; B60K 2007/0092; B60Y 2400/60
USPC .......................................................... 310/71
See application file for complete search history.

(56) References Cited

U.S. PATENT DOCUMENTS

| | | | |
|---|---|---|---|
| 7,579,732 B2 | 8/2009 | Yamaguchi et al. | |
| 2003/0173842 A1* | 9/2003 | Kobayashi | H02K 15/0062 |
| | | | 310/71 |
| 2004/0256941 A1* | 12/2004 | Yoneda | H02K 15/095 |
| | | | 310/179 |
| 2008/0129131 A1* | 6/2008 | Shin | H02K 3/522 |
| | | | 310/71 |
| 2010/0181851 A1* | 7/2010 | Shinkawa | H02K 3/28 |
| | | | 310/198 |
| 2012/0126646 A1* | 5/2012 | Nakagawa | H02K 5/225 |
| | | | 310/71 |
| 2012/0235524 A1* | 9/2012 | Sasaki | H02K 3/522 |
| | | | 310/71 |
| 2013/0181569 A1 | 7/2013 | Nakagawa et al. | |
| 2015/0295371 A1* | 10/2015 | Houzumi | B29C 45/1459 |
| | | | 264/261 |
| 2015/0311764 A1* | 10/2015 | Nakamura | H02K 3/522 |
| | | | 310/71 |
| 2016/0072351 A1* | 3/2016 | Mizoue | H02K 3/522 |
| | | | 310/71 |
| 2016/0118849 A1* | 4/2016 | Popov | H02K 1/148 |
| | | | 310/67 R |
| 2016/0380498 A1* | 12/2016 | Bitzer | H02K 1/148 |
| | | | 310/156.01 |
| 2017/0353132 A1* | 12/2017 | Qin | H02K 11/33 |
| 2020/0204030 A1* | 6/2020 | Jonker | H02K 7/14 |
| 2022/0247269 A1* | 8/2022 | Jefferies | H02K 1/146 |
| 2022/0247270 A1* | 8/2022 | Jefferies | H02K 1/2706 |

FOREIGN PATENT DOCUMENTS

| | | |
|---|---|---|
| DE | 11 2016 001 848 T5 | 1/2018 |
| EP | 1 252 034 B1 | 11/2004 |
| EP | 3 128 650 A1 | 2/2017 |
| JP | H08-511490 A | 12/1996 |
| JP | 2004-320986 A | 11/2004 |
| JP | 2012-110203 A | 6/2012 |
| WO | 2013/025096 A1 | 2/2013 |
| WO | 2016/170276 A1 | 10/2016 |
| WO | 2016/184622 A1 | 11/2016 |

\* cited by examiner

STATOR WITH TERMINAL CONNECTOR

FIELD OF THE INVENTION

The present invention relates to an in-wheel motor comprising a stator and a rotor arranged around the stator, the stator comprising a cylindrical surface on which a plurality of axially oriented core members, e.g. bars of magnetic laminated material, is arranged, wherein the axially oriented core members are spaced apart from each other by slots, the rotor comprising a plurality of permanent magnets arranged at an inner circumference of the rotor and which face radial outer surfaces of said axially oriented core members, wherein the stator further comprises coils with windings and terminals, and a connector for connection to the terminals of the coils. The invention further relates to a cylindrical body comprising a number of axially oriented core members, such as bars of laminated magnetic material, each core member being encircled by windings of a respective coil having terminals, and to a ring shaped connector for connection to the coil terminals of such a cylindrical body.

BACKGROUND ART

An in-wheel drive assembly is known from WO 2013/025096 which describes an electric vehicle with an in-wheel electric motor in which the rotor is coupled to a rim of the wheel carrying one or more tyres. The stator is mounted on the frame of the vehicle via a wheel suspension system. The known in-wheel motor is part of a direct drive wheel in which the electromagnets of the motor directly drive the rim and the tyre without any intermediate gears. In this manner, weight and space are saved and the number of components in the drive assembly is minimized.

The torque that is generated by the in-wheel motor depends on the flux-carrying surface between the rotor and the stator and is a quadratic function of the rotor radius. The rotor magnets are placed as far outwardly as possible around the stator, to obtain a rotor radius as large as possible within the fixed dimensions of the motor, and the motor design is optimised to minimize the gap between the rotor and the stator for delivering a maximum power and torque to the tyre. The gap width between rotor and stator is on the other hand designed to be large enough to absorb mechanical impacts on the wheel during driving conditions.

The windings of the stator are powered by control electronics that are situated within the stator, and which convert electrical energy from a power supply system of the vehicle, e.g. a battery pack and/or an electric generator, to an AC current that is suitable for use by the electric motor. Such control electronics typically comprise power control electronics, e.g. IGBT current modules and a current regulator as described in EP 1 252 034. By using the control electronics to control the current and/or voltage supplied to the windings of the stator, the magnetic field vector of the flux generated by the stator is controlled and the electric motor is operated at the desired torque and/or speed of rotation. By integrating the control electronics within the stator, the length of bus bars which run from the control electronics to the electromagnets can remain short, which is highly desirable in view of minimizing losses of the high electrical currents and voltages generally required for operating such an electric motor, which may for instance amount to 300 A at 700V or more.

In order to cool the electric motor and/or the control electronics, the known drive assembly is provided with a cooling system having one or more cooling channels that are situated close to an outer surface of the stator and/or the control electronics, through which liquid coolant can flow into and out of the drive assembly.

The in-wheel drive assembly can be embodied as a substantially self-contained module, without any moving parts of the vehicle attached to and/or extending into the rotor. The interior space defined by the rotor is preferably substantially closed off to prevent ingress of foreign particles, such as dust and/or wear particles released by a brake system of the vehicle and/or by the road, into said interior.

The in-wheel drive assembly may be mounted on the vehicle in a variety of positions by connecting the vehicle side of the drive assembly to the vehicle frame. A rim for mounting a tire may be attached to the rotor, preferably to a substantially cylindrical outer surface of the rotor. The electromagnets are formed by coils which are each wound around a core which comprise a magnetic material. WO 2013/025096 however does not describe the manner in which the coils of the stator are connected to power supply lines which run from a power supply in much detail.

From US 2003/0173842 a three-phase DC thin brushless motor is known which is to be used in a hybrid automobile disposed between an engine and a transmission. The motor includes a rotor connected, e.g. directly connected, to a crankshaft of the engine and a ring-like stator enclosing the rotor. The stator includes a plurality of magnetic poles that have windings on cores, a stator holder that contains the magnetic poles, and an annular centralized distribution unit that concentratedly distributes currents to the windings. The distribution unit has a diameter greater than the rotor and in an exemplary embodiment comprises a plurality of bus bars which have different diameters and are stacked in a radial direction, each of the bus bars having a plurality of radially inwardly projecting tabs for connecting to the windings.

DE112016001848 describes an electrical connection device comprising at least two sub-assemblies, wherein each sub-assembly comprises two electrically conductive elements, a plurality of connectors capable of conducting an electric current and linked mechanically to each of the conductive elements, the connectors being disposed to either side of the device, and an insulating shroud partially covering the conductive elements, the sub-assemblies being stacked. The present invention aims to provide an in-wheel motor in which the connector is easily connected to terminals of the coils.

It is a further object of the invention to provide an in-wheel motor with a stator having coils, in which the area along which the coils can generate magnetic flux is maximized.

It is a further object of the present invention to provide such an in-wheel motor comprising a compact connector between terminals of coils of the stator and power supply lines.

SUMMARY OF THE INVENTION

To this end, according to a first aspect, the invention provides an in-wheel motor comprising a stator and a rotor arranged around the stator, the stator comprising a cylindrical surface on which a plurality of axially oriented core members is arranged, wherein the axially oriented core members are spaced apart from each other by slots and extend substantially in an axial direction from a first end of the cylindrical surface to a second end of the cylindrical surface, the rotor comprising a plurality of permanent magnets arranged at an inner circumference of the rotor and which face radial outer surfaces of said axially oriented core members, the stator further comprising coils with windings and terminals, and a connector for connection to the terminals of the coils, said connector comprising at least two mutually isolated conductors arranged at the first end of the cylindrical surface near curved ends of the windings, the conductors each comprising one or more conducting bodies which extend circumferentially around an axis of rotation of the in-wheel motor and a plurality of contact members extending therefrom, wherein the contact members are arranged for connecting to one of said terminals, wherein the one or more conducting bodies of each conductor are spaced apart along the axial direction from the one or more conducting bodies of the other conductor or conductors.

Electrical power can thus be supplied from power a supply, via the conductors to the coils, with only a single isolated power supply line running from the power supply electronics to each conductor. The number of individual points of attachment for connecting the conductors to a power supply is thus minimized and the risk of electrical-break down occurring at such points of attachment is reduced.

The arrangement of the conductors, each of which is preferably formed as a bus bar, allows the connector to be of a compact construction. This is particularly the case when the conductor bodies have a width along the axial direction which is substantially smaller than the height of the conductor body along the radial direction of the cylindrical surface. Such a compact connector also increases the amount of space on the stator that remains available for the bars and the windings, in this manner providing a large surface area along which the coils can generate magnetic flux.

Though each conductor is preferably formed as a single unit, alternatively, each conductor may comprises a plurality of conducting bodies, e.g. each in the shape of a ring segment, conductively connected to each other. Each conductor body of a conductor is at the same phase, current and voltage.

The manner of connecting of the coil terminals to the connector allows the windings of the coils to closely follow the core members along the longitudinal direction of the core members, while the outer radius of the curved portion of the windings at the distal ends of the core members can be kept relatively small, e.g. the outer radius may be half or less than a maximum distance between outer edges of the winding along the longitudinal axis. By keeping the length of the curved ends along the axial direction small with respect to the length of the longitudinally extending portions of the windings, the total useful surface for generating magnetic flux for driving a rotor is maximized.

As the circumferential conductors are arranged at an end of the cylindrical surface spaced that is axially apart from the curved ends of the coil windings, when the connector is being positioned relative to the cylindrical surface, the connector can be moved axially towards the terminals until each of the terminals can be fixed to a corresponding contact member of a conductor. During this axial movement the axial distance between the terminals and their corresponding coils, and preferably also the radial distance therebetween, will generally remain substantially constant. This facilitates assembly and maintenance of the in-wheel motor as the need to individually move the terminals during mounting is minimized.

The contact members of said conductors typically each comprise a first part which extends radially from the corresponding conductor body and a second part which extends in a direction parallel to the axial direction of the isolator body, and wherein the second parts of the contact members are arranged side by side in a circumferential direction of the isolator body. As the second parts of the contact members thus extend in the axial direction, the terminals of the coils can be connected to the contact members without converging towards each other. This reduces the risk of sparks occurring between the terminals. In this respect it is advantageous if the terminal of each coil extends from a lower winding, i.e. a winding of the coil that is radially close or closest to the cylindrical surface, to a corresponding contact member of a conductor that is axially spaced apart from the curved end of said lower winding.

Preferably, the contact members comprise a curved portion at their side facing the axial core members. During assembly of the in-wheel motor, the contact members can thus be placed into contact with the terminals by sliding the connector axially towards the core members, in such a manner that the first contact between the terminals and a contact member is at the curved portion. For instance, the curved portion may connect the first part to the second part, with the second part of the contact member extending in a direction away from the axially oriented core members. Alternatively, the second part may extend in a direction towards the axially oriented core members and comprise the curved portion at the end of the second part closest to the core members.

In an embodiment the axially oriented core members are axially oriented bars of a magnetic laminated material. The bars may for instance be formed by laminating several plates of the magnetic material, such as steel, to each other. These layers are preferably stacked on each other in a direction parallel to the axis of rotation.

In an embodiment the number of conductors is at least equal to the number of electrical phases for which the in-wheel motor is adapted to run. For instance, for a three-phase in-wheel motor, the number of conductors with circumferential bodies would at least be three.

In an embodiment the windings are concentrated windings. The curved ends of such windings generally take up considerably less space than curved ends of distributed windings while enabling a large flux to be generated by the windings and the core members.

In an embodiment the axially oriented core members each have an outer surface facing radially outward, wherein, when viewed in projection onto a plane normal to a centre axis of the cylindrical surface, the terminals and the connector lie within an incircle of the outer surfaces of the axially oriented core members. As no part of the coils, terminals or of the connector extend radially further outward than the radial outer surfaces of the core members, a rotor which surrounds the stator can be arranged with permanent magnets close the outer surfaces, e.g. such that an air gap between the permanent magnets of the rotor and the outer surfaces is within the range of 0.5 to 2 mm, preferably within the range of 1.0 to 1.5 mm.

In an embodiment the connector comprises a ring-shaped isolator body with at least two axially spaced apart grooves each holding a corresponding one of said conductors. For preventing electric breakdown between the conductor bodies, the grooves preferably completely contain the conductor bodies, with only the contact members of the conductors protruding out of the grooves.

In an embodiment, the length of the axially oriented core members along the axial direction is greater than the diameter of an incircle of the outer surfaces of the axially oriented core members. A large surface for generating magnetic flux is thus provided.

In an embodiment the in-wheel motor further comprises an isolating cover having an annular surface on which radial ribs are provided which extend parallel to the longitudinal axis of the annular surface, wherein said ribs are arranged between two adjacent contact members of the at least two conductors. The ribs further isolate the contact members from each other, by increasing the length of the creep path between two adjacent contact members.

In an embodiment the core members extend from a cylindrical body, each of the conducting circumferential bodies having an inner diameter equal to or greater than an inner diameter of the cylindrical body. The radial inner edges of the conducting bodies are thus arranged at a greater radial distance from the longitudinal axis of the cylindrical body than the inward facing surface of said cylindrical body, and can be supported on the isolator body.

Preferably, the cylindrical body and the core members are formed together as a single unit, allowing the cylindrical body and core members to be mounted in one go onto a cylinder such as a stator body. The cylindrical body is preferably made from a magnetic material, e.g. the same magnetic laminated material as the core members. For instance, the cylindrical body and the core members may be formed by laminating a number of annular steel plates together, wherein in each plate a number of portions are punched out along the outer periphery to form the core members and the axially extending slots when the plates are laminated together.

In an embodiment, at least two of said conductor bodies have a same inner diameter and/or a same outer diameter. These conductor bodies can thus be used and manufactured interchangeably. In case the connector comprises a third conductor body, this may have an inner and/or outer diameter greater than that of the at least two conductor bodies, though the radial height of all conductor bodies of the connector is preferably substantially the same.

In an embodiment the stator comprises a cylindrical hollow stator body having an open end, wherein the cylindrical surface of is mounted on said hollow stator body with its first end towards the open end, wherein the connector is arranged axially between the first end of the cylindrical surface end and the open end of the hollow stator body. The open end is preferably arranged at a road side of the in-wheel motor. Thus, additional parts of components of the in-wheel motor can be placed inside the stator body from a road side of a vehicle and without detaching the stator from the vehicle.

In an embodiment the in-wheel motor further comprises power control electronics arranged within the stator, wherein conductors are arranged at a road side of the stator and are connected to the power control electronics. The power control electronics, which for instance comprise IGBTs for converting electrical power to a form suitable for driving the in-wheel motor, can thus easily be mounted inside the stator, or inspected, from the road side of a vehicle. During mounting and/or inspection of the power control electronics the in-wheel motor may remain attached to the vehicle.

In an embodiment, when viewed in the radial direction, each of the core members comprises a middle section around which windings of said coils are wound, wherein the radial outer surface of each core members has a width greater width than a width of the corresponding middle section. The width of the radial outer surface and of the middle section is measured along the circumferential direction of the plurality of core members. A substantial part of the windings of the coils is thus surrounded by the core members. Preferably, the gaps between the radial outer surfaces have a surface area which is less than 10% of the sum of radial outer surfaces of the core members.

According to a second aspect, the present invention provides a cylindrical body comprising a plurality of axially oriented core members separated by axial slots, each core member being encircled by windings of a respective coil having terminals, wherein the axially oriented core members each have an outer surface facing radially outward, wherein, when viewed in projection onto a plane normal to a centre axis of the cylindrical body, the terminals lie within an incircle of the outer surfaces of the axially oriented core members. The radial outer surfaces of the terminals are preferably inscribed by a circle. The cylindrical body is preferably a cylindrical body for an in-wheel motor as described herein, and comprising the cylindrical surface thereof. The axially oriented core members preferably are axially oriented bars of a magnetic laminated material.

In an embodiment, when viewed in projection onto a plane normal to a centre axis of the cylindrical body, the terminals lie outside an inner radial surface of the cylindrical body. Preferably, in said projection, the entire connector also lies substantially on and/or outside said inner radial surface.

In an embodiment, the terminal of each coil extends from a lower winding of the coil away from the core members and away from the longitudinal axis of the cylindrical body. The terminals thus do not converge towards the longitudinal axis of the body but remain spaced apart from each other at fixed distances. The free ends of the terminals preferably extend parallel to each other to facilitate connection to the connector.

According to a third aspect, the present invention provides a ring-shaped connector for connection to coil terminals, the connector comprising a ring-shaped isolator body with at least two axially spaced apart slots, wherein in each slot a conductor is provided which comprises a one or move circumferentially arranged conductor bodies and a plurality of circumferentially spaced contact members, each of said contact members comprising first part extending radially from a corresponding one of said one or more conductor bodies, and an axially extending second part, the second parts of the contact members being situated side by side in a circumferential direction of the isolator body for receiving the coil terminals.

In an embodiment the ring shaped connector is adapted to be mounted on a stator which is provided with axially extending core members around which the coils are wound, e.g. as described earlier herein, wherein the contact members each comprise a curved portion at their side facing the axial core members. The ring-shaped connector can thus be arranged to contact coil terminals of the stator by axially moving the ring shaped connector towards the stator such that initial contact with between the terminals and the contact members is at the curved portions. The axially oriented core members are axially oriented bars of a magnetic laminated material.

In an embodiment the free ends of the second parts of the conductors lie on a common circle. Sufficient contact between the contact members and the terminals can thus be ensured when the ring shaped connector has been mounted to the cylindrical surface, e.g. once the ring shaped connector has been attached to the first edge of the cylindrical surface.

In an embodiment the contact members of the ring-shaped connector are connected to terminals of a cylindrical body as described herein. The ring shaped connector and the cylindrical body thus form a kind connection similar to plug and socket connection.

SHORT DESCRIPTION OF DRAWINGS

The present invention will be discussed in more detail below, with reference to the attached drawings, in which FIGS. 1A and 1B respectively show a cross-sectional view and an cut-away isometric view of a drive assembly for use with the present invention, FIG. 2 shows a stator as may be used in the in-wheel motor of FIGS. 1A and 1B;

DESCRIPTION OF EMBODIMENTS

Figure 1A:
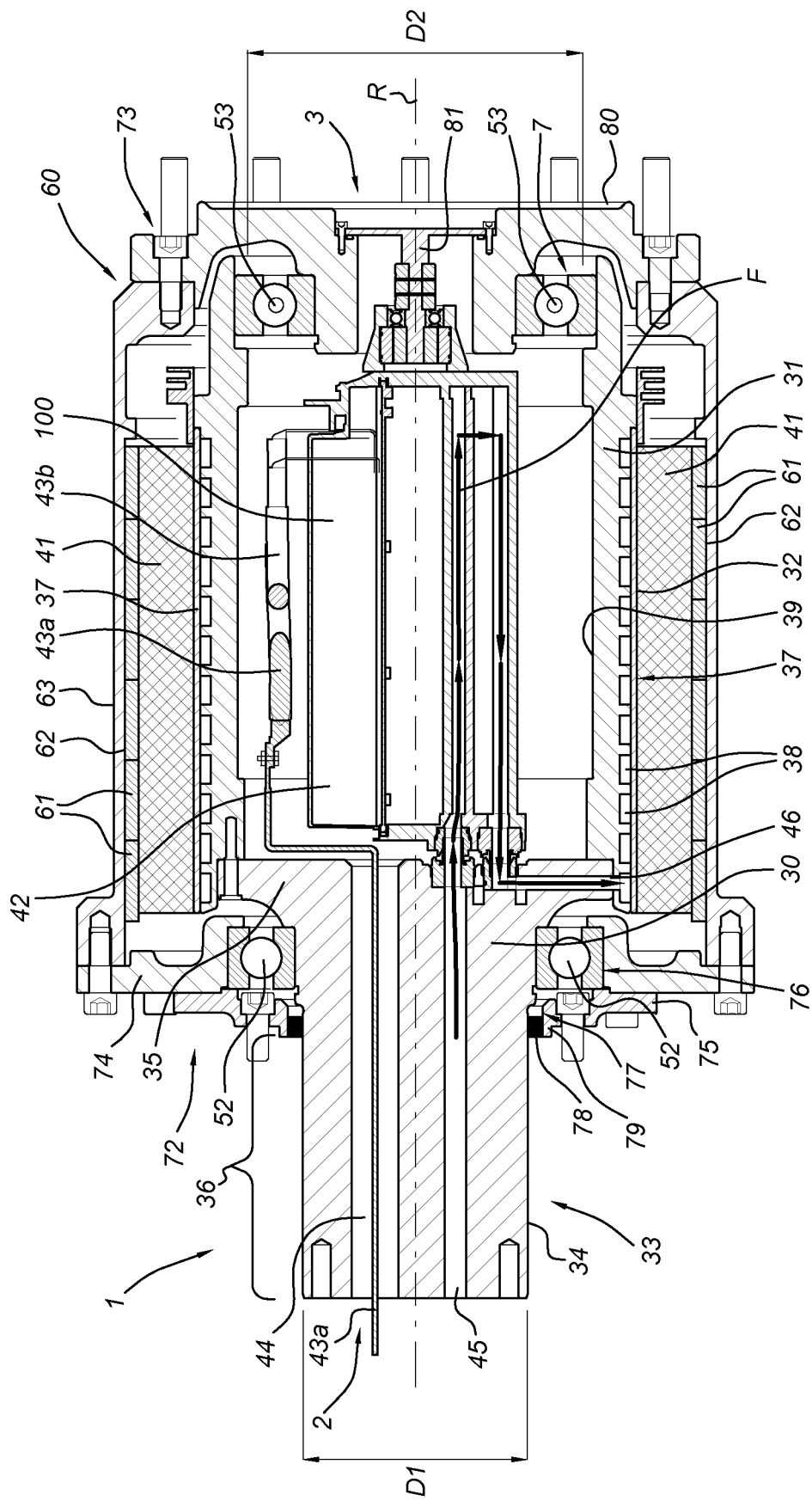

FIG. 1A shows a cross-sectional view of a drive assembly 1 for use with the present invention. The drive assembly comprises a stator 30 with a hollow stator body 31 which has an outer surface 32 around which a rotor 60 is arranged. The drive assembly further comprises an connector stub 33, arranged at a vehicle side 2 of the assembly 1 for attaching the drive assembly to the vehicle. The connector stub 33 comprises a shaft 34 and flange 35 which is fixedly connected to the stator body 31. The flange 35 lies within the rotor 60 and has a larger diameter than a portion 36 of the shaft 34 which lies outside the peripheral surface 63 of the rotor 60. For supporting rotational movement of the rotor 60 around the axis of rotation R, vehicle side bearings 52 are provided via which the rotor supported on the stub 33 on the vehicle side. On the road side 3, the rotor is rotatingly supported on the stator body 31 via road side bearings 53.

A plurality of permanent magnets 61 is attached on an inner circumferential surface 62 of the rotor 60 and can rotate around electromagnets 41 of the stator 30. The electromagnets 41 are fixed on the stator body 31 and drive rotation of the rotor by interaction between the permanent magnets 61 and the magnetic flux generated by the electromagnets 41. The stator 30 and rotor 60 form an electric motor adapted for directly driving rotation of a wheel around axis of rotation R. For controlling and powering the electromagnets 41, power control electronics 42 are arranged within the hollow stator body 31. The power control electronics 42 comprise components, such as IGBT's, for converting electrical energy from a power supply system of the vehicle, e.g. a battery pack and/or an electric generator, to an AC form suitable for use by the electric motor. A resolver 81 provides an angular position signal indicative of an angular position of the rotor to the power control electronics so that the alternating current is supplied in phase with the magnetic field of the rotor.

To prevent overheating of the power control electronics when the electric motor is in operation, cooling ducts (not shown) are provided close to the power control electronics 42 within the interior of the stator body 31 and spaced apart from the body 31. Coolant is supplied to the cooling ducts via a coolant supply channel 45 which runs through the connector stub 33 from the exterior of the rotor to its interior. After having cooled the power control electronics 42, the coolant flows via passage 46 in the connector stub 33, to a cooling jacket 37 which is provided on the outer surface 32 of the stator body 31. The cooling jacket 37 is provided with channels 38 which form a circuit that runs along the hollow cylindrical body 31 and provides a passage through which liquid coolant flows to cool the electromagnets 41 which are arranged at an outer side 40 of the cooling jacket 37. Relatively cold coolant can thus be supplied through the coolant supply channel 45 with the coolant warming up during its passage through the cooling ducts and absorbing heat energy from the power control electronics 42, and subsequently passing through channels 38 to absorb heat-energy from the electromagnets 41 before being removed from the drive assembly 1 and led back to the vehicle through a coolant discharge channel (not shown) which extends through the connector stub 33. The warmed up coolant is preferably cooled in a heat exchanger on the vehicle, after which it is recirculated through the coolant supply channel 45.

Power supply lines 43a, 43b for supplying power to the power control electronics 42 run from the exterior of the rotor 60, through passage 44 in the connector stub 33, to the power control electronics.

The rotor 60 comprises a substantially cylindrical rotor body 71 which has transverse ends 72,73 respectively at its vehicle side 2 and at its road side 3. Both transverse ends 72,73 are substantially closed off in order to prevent foreign particles, such as dust and wear particles from the road or released by a braking system of the vehicle, from entering the interior of the hollow rotor 60. The vehicle side of the rotor is substantially closed off by a side plate 74 which extends transversely to the axis of rotation R and by a cover plate 75. The side plate 74 and cover plate 75 are each provided with an opening through which the portion 34 of the connector stub 33 extends. The side plate 74 supports the vehicle side bearings 52 while the cover plate 75 is attached to the side plate 74 to cover the bearings 51 at their transverse vehicle side 2 and comprises an opening 77 through which portion 34 extends. The cover plate 75, together with a shaft seal 78 which is arranged between the inner circumferential edge 79 of the opening 77 and the outer circumference of the shaft 34 of the connector stub 33, prevents foreign particles from damaging the vehicle side bearings 52. Additionally, the cover plate 75 and shaft seal 78 substantially prevent such particles from entering the interior 5 of the rotor from the vehicle side 2, where the particles could interfere with the electromagnets 41.

The road side bearings 53, which are arranged at an inner side of the stator body 31, are covered on the road side 3 by a second cover plate 80. A resolver 81 rotationally connects the stator 30 to the second side plate 80 and is adapted for detecting an angular position of the rotor 60 relative to the stator 30.

Figure 1B:
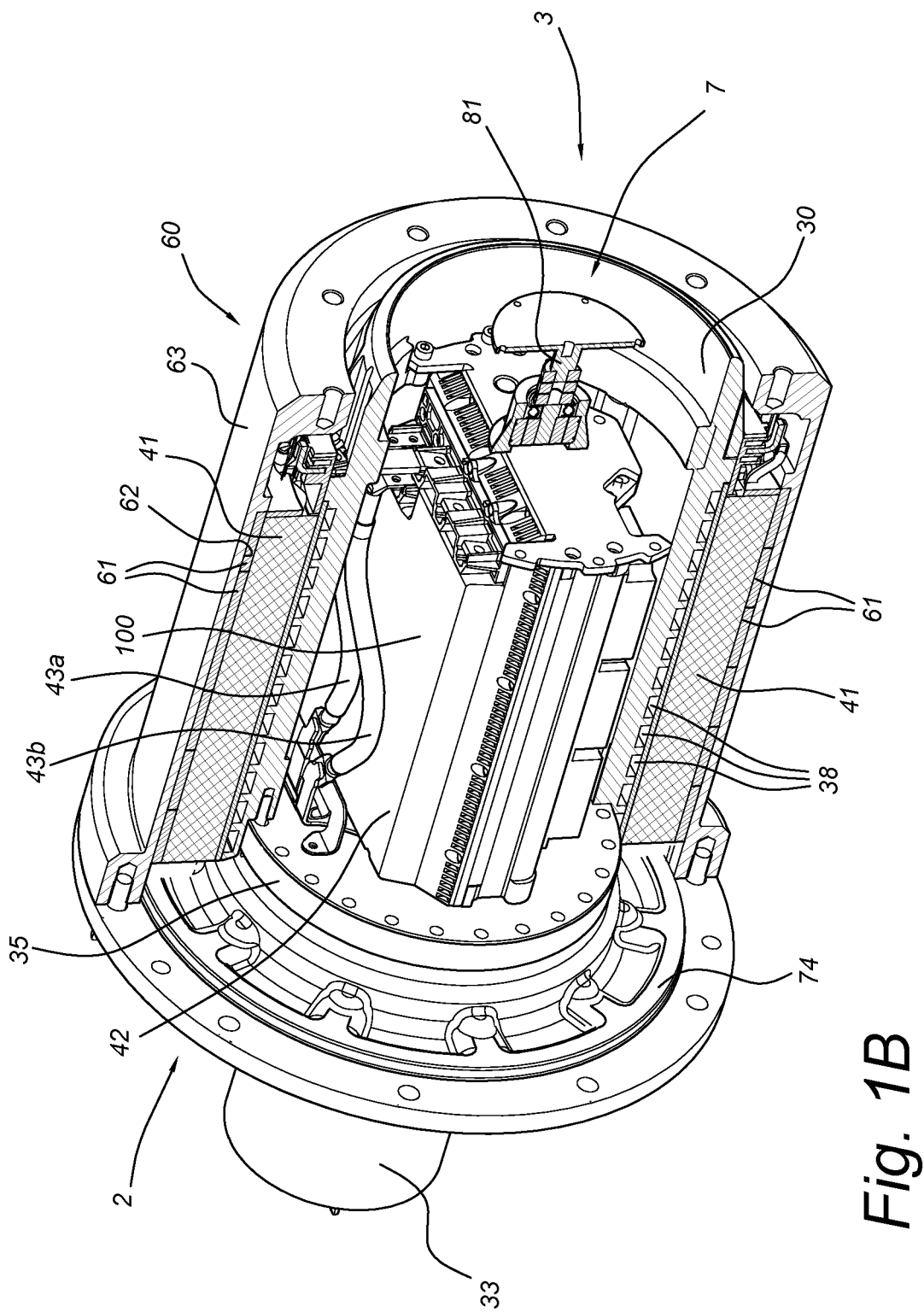
Figure 2:
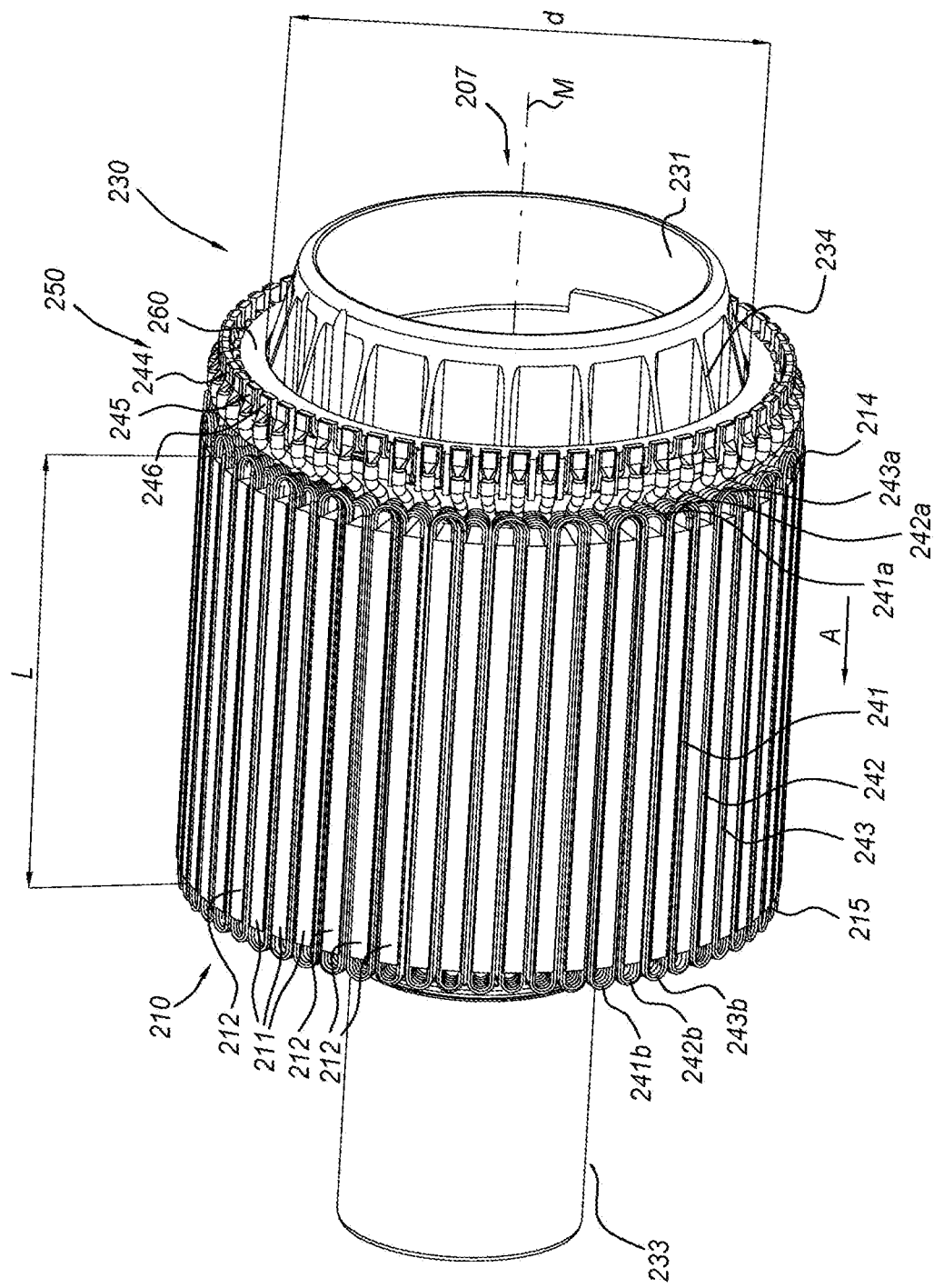

FIG. 1B shows a partially cut-away isometric view of the drive assembly of FIG. 1A, in which the second cover plate 80 and the road side bearings 53 however are not shown to allow a better view of the hollow stator body 31 and the resolver 81;

FIG. 2 shows a stator 230 of an in-wheel motor according to the present invention, which may correspond to the stator 30 shown in FIGS. 1A and 1B. The stator 230 has a hollow stator body 231 with an open end 207 at a road side of the stator. At an opposite side, i.e. the vehicle side, the stator comprises a connector stub 233 for fixed attachment of the motor to a vehicle.

Figure 3:
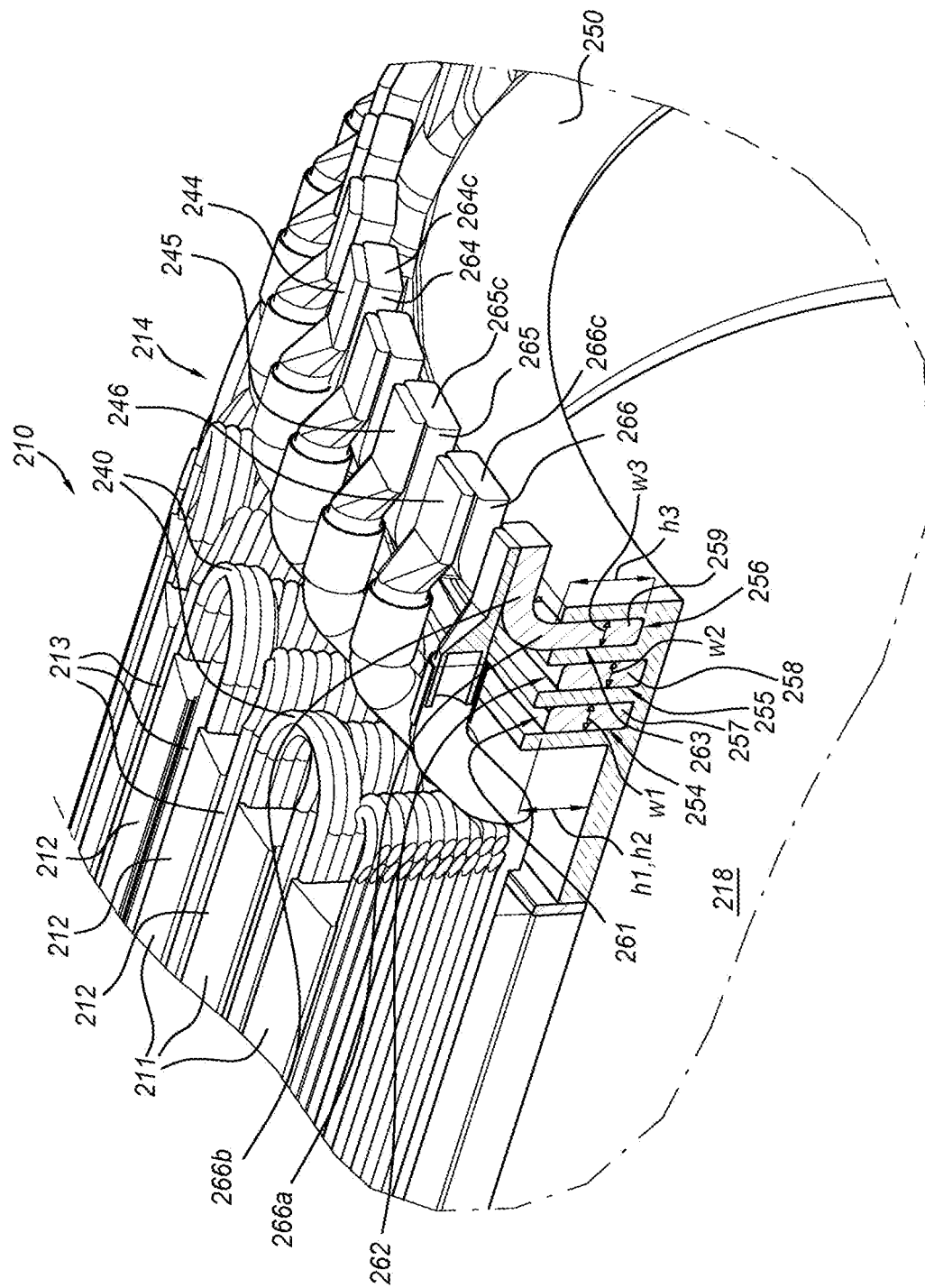
FIG. 3 shows a detail of a connector of FIG. 2.

FIG. 3 shows a detail of the connector 250 of FIG. 2, but showing no part of the stator other than the cylindrical surface 210. The cylindrical surface may be arranged directly adjacent to the outer surface 38 of the cooling jacket 37 shown in FIGS. 1A and 1B, and or arranged on the stator body 231 of FIG. 2. The cylindrical surface is provided with a plurality of core members in the form of bars 211 of a magnetic laminated material. The bars extend from a first end 214 to a second end 215 of the cylindrical surface 210 parallel to axial direction A and have a length L. In the example shown the length L is greater than the inner diameter d of the cylindrical surface on which the bars 211 are arranged. Each of the bars 211 has a middle section around which the windings of a coil are wound, which middle section has a width that is smaller than the width of the bar's radial outer surface 212.

Coils 240 with windings 241, 242, 243 are provided around the bars, with the windings 30 having portions of a length substantially equal to the length I and which run substantially parallel the bars, as shown in FIG. 2. At the transverse ends of the bars the windings comprise curved ends 241a, 242a, 243 and opposite curved ends 241b, 242b, 243b. Terminals 244, 245, 246 of the coils are all arranged at one side of the cylindrical surface 210, near the first end 214. Each terminal extends from a lower winding of the coil away from the bars 211 and away from the longitudinal axis M of the cylindrical surface 210, without converging towards the longitudinal axis of the body. The end points of the terminals thus lie on a circular contour.

The terminals are connected to three isolated conductors 254, 255, 256, each for carrying current at a different phase. The conductors 254,255,256 comprise respective circumferential conductor bodies 257,258, 259 which are axially spaced apart from each other. The conducting bodies, which have substantially equal widths w1,w2,w3 along the axial direction A and substantially equal heights h1,h2,h3 along the radial direction, are held by an isolating body 260, in grooves 261,262,263 thereof. The grooves have heights greater than or equal to the heights of the conducting bodies to isolate the bodies from each other. A plurality of contact members 264, 265, 266 extend from each conductor body out of the corresponding groove, for making contact with the terminals. A first portion 266a of each contact member extends substantially radially, and a second portion 266b extends substantially parallel to the axial direction of the isolator body 260. The part of the contact members that faces the bars 211 is curved, so that the terminals may easily be slid onto the second portions. The difference in length of the second portions of the conducting bodies may thus be equal to the distances at which the conducting bodies are axially spaced apart from each other.

Each terminal extends from a lower winding of its corresponding coil, to a contact member of a conductor that is axially and radially spaced apart from the curved end of said lower winding. The second portions of the contact members extend substantially parallel to each other and have lengths selected such that their free ends 264c, 265c, 266c lie on a common circle.

Figure 4:
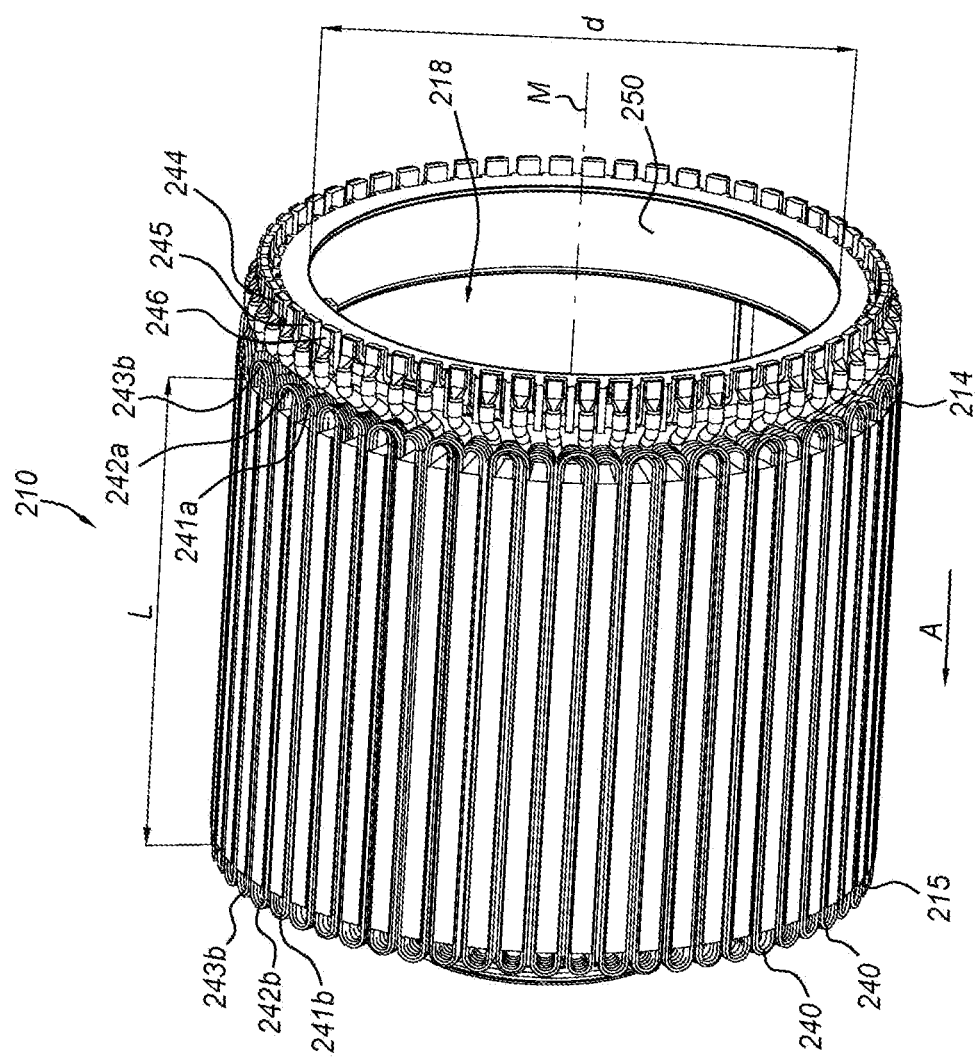
FIG. 4 shows a portion of a cylindrical body according to the present invention, as may be part of the stator of FIG. 2.

Another view of the connector 250 is shown in FIG. 4. The bars 211 extend from a cylindrical body 218 which is made from the same laminated magnetic material as the bars and which provides or lies against the cylindrical surface 210 of the stator. The cylindrical body 218 can be mounted on stator body 231, e.g. by interference fitting the cylindrical body thereto, separate from the connector 250. Once the cylindrical body 218 is mounted on the stator, the connector 250 can be attached by sliding it along sloped end portion 234 of the stator body 231 (see FIG. 2) until it reaches the position shown in FIG. 4. By sliding the connector in this manner onto the stator the connector is radially aligned with the stator, while the terminals may make sliding contact with the curved portions and second ends of the contact members until edge 251 of the connector abut the first end 214 of the cylindrical surface. The connector may thus easily be mounted on the stator from the road side of the in wheel motor, e.g. in a similar fashion as a plug is mounted in a socket.

If the cylindrical body 218, coils 240, terminals 244, 245, 246 and conductors 254, 255, 256 are projected onto a plane normal to a centre axis of the cylindrical surface 210 the coils, including terminals 244, 245, 246, and the connector 250, including conductors 254, 255, 256 all lie completely within an in circle of the radial outer surfaces 212 of the bars 211, and completely outside of the inner surface 221 of the cylindrical body 218.

In summary, the invention relates to an in-wheel motor with a stator and a rotor arranged around the stator, the stator comprising a cylindrical surface and coils with windings around axially oriented bars and comprising coil terminals, the motor further comprising a connector comprising at least two mutually isolated conductors arranged at the first end of the cylindrical surface near curved ends, the conductors each comprising a circumferential conducting body and a plurality of contact members extending from conducting said body and arranged for connecting to one of said terminals, wherein the circumferential conducting bodies are axially spaced apart from each other.

The present invention has been described above with reference to a number of exemplary embodiments as shown in the drawings. Modifications and alternative implementations of some parts or elements are possible, and are included in the scope of protection as defined in the appended claims.

The invention claimed is:
1. An in-wheel motor, comprising:
a stator (230); and
a rotor (60) arranged around the stator,
the stator (230) comprising a cylindrical surface (210) on which a plurality of axially oriented core members (211) is arranged, the axially oriented core members being spaced apart from each other by slots (213) and extending substantially in an axial direction (A) from a first end (214) of the cylindrical surface to a second end (215) of the cylindrical surface, and
the rotor comprising a plurality of permanent magnets arranged at an inner circumference of the rotor and which face radial outer surfaces of said axially oriented core members,
the stator (230) further comprising coils (240) with windings (241, 242, 243) and terminals (244, 245, 246), and a connector (250) for connection to the terminals (244, 245, 246) of the coils,
said connector comprising at least two mutually isolated conductors (254, 255, 256) arranged at the first end of the cylindrical surface (210) near curved ends (241a, 242a, 243a) of the windings (241, 242, 243),
the at least two conductors each comprising one or more conducting bodies (257, 258, 259) which extend circumferentially around an axis of rotation of the in-wheel motor and a plurality of contact members (264, 265, 266) extending therefrom, the one or more conducting bodies (257, 258, 259) of each of the at least two conductors being spaced along the axial direction (A) from the one or more conducting bodies of an other of the at least two conductors,
wherein the contact members are each arranged for connecting to a respective one of said terminals (244, 245, 246), the contact members each comprising a first part (266a) which extends radially from a body of a corresponding conductor, and a second part (266b) which extends in a direction parallel to the axial direction (A),
wherein the contact members each comprise a curved portion at their side facing the axial core members, and wherein the second parts of the contact members are arranged side by side in a circumferential direction of the connector, the terminals making sliding contact with the curved portions and second ends of the contact members.

2. The in-wheel motor according to claim 1, wherein the axially oriented core members (211) each have an outer surface (212) facing radially outward, wherein, when viewed in projection onto a plane normal to a center axis of the cylindrical surface (220), the terminals (244,245,246) and the connector (250) lie within an incircle (C) of the outer surfaces (212) of the axially oriented core members (211).

3. The in-wheel motor according to claim 1, wherein the connector (250) comprises a ring-shaped isolator body (260) with at least two axially spaced apart grooves (261,262,263) each holding a corresponding one of said conductors.

4. The in-wheel motor according to claim 1, wherein a ire length (L) of the axially oriented core members along the axial direction (A) is greater than a diameter (d) of an incircle of the outer surfaces of the axially oriented core members.

5. The in-wheel motor according to claim 1, wherein the core members extend from a cylindrical body (218), each of the conducting circumferential bodies having an inner diameter equal to or greater than an inner diameter of the cylindrical body.

6. The in-wheel motor according to claim 1, wherein free ends (266c) of the second parts of the conductors lie on a common circle.

7. The in-wheel motor according to claim 1, wherein at least two of said conductor bodies have a same inner diameter and/or a same outer diameter.

8. The in-wheel motor according to claim 7, wherein the connector comprises a third conductor body which has an inner and/or outer diameter greater than that of the at least two conductor bodies.

9. The in-wheel motor according to claim 1, wherein the curved portion connects the first part to the second part, with the second part of the contact member extending in a direction away from the axially oriented core members.

10. The in-wheel motor according to claim 1, wherein the second part extends in a direction towards the axially oriented core members and comprise the curved portion at the end of the second part closest to the core members.

11. The in-wheel motor according to claim 1,
wherein the stator further comprises a cylindrical hollow stator body (231) having an open end (231),
wherein the cylindrical surface is mounted on said hollow stator body with a first end (214) towards the open end, and
wherein the connector is arranged axially between the first end (214) of the cylindrical surface and the open end of the hollow stator body.

12. The in-wheel motor according to claim 1, further comprising:
power control electronics arranged within the stator, wherein conductors are arranged at a road side of the stator and are connected to the power control electronics.

13. The in-wheel motor according to claim 1, wherein, when viewed in the radial direction, each of the core members (211) comprises a middle section (219) around which windings of said coils are wound, wherein the radial outer surface of each core member has a width greater width than a width of the corresponding middle section.

14. The in-wheel motor according to claim 1, wherein the axially oriented core members are axially oriented bars of a magnetic laminated material.

\* \* \* \* \*